(12) United States Patent
Berry

(10) Patent No.: US 10,058,112 B2
(45) Date of Patent: Aug. 28, 2018

(54) SWEETENER COMPOSITION INCLUDING ENZYMATICALLY PROCESSED STEVIA AND METHOD OF MANUFACTURING

(71) Applicant: Eco Sweeteners, LLC, New Orleans, LA (US)

(72) Inventor: George W. Berry, Carriere, MS (US)

(73) Assignee: Eco Sweeteners LLC, New Orleans, LA (US)

( * ) Notice: Subject to any disclaimer, the term of this patent is extended or adjusted under 35 U.S.C. 154(b) by 337 days.

(21) Appl. No.: 14/963,174

(22) Filed: Dec. 8, 2015

(65) Prior Publication Data

US 2016/0088865 A1    Mar. 31, 2016

Related U.S. Application Data

(60) Provisional application No. 62/168,455, filed on May 29, 2015, provisional application No. 62/089,729, filed on Dec. 9, 2014.

(51) Int. Cl.

| | |
|---|---|
| *A23L 1/236* | (2006.01) |
| *A23L 33/125* | (2016.01) |
| *A23L 5/00* | (2016.01) |
| *A23L 29/30* | (2016.01) |
| *A23L 27/30* | (2016.01) |

(52) U.S. Cl.
CPC .............. *A23L 1/2366* (2013.01); *A23L 5/00* (2016.08); *A23L 27/36* (2016.08); *A23L 29/30* (2016.08); *A23L 33/125* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 4,219,571 | A | 8/1980 | Hayashibara |
| 8,318,459 | B2 | 11/2012 | Markosyan |
| 8,591,980 | B2 | 11/2013 | Markosyan |
| 8,647,844 | B2 | 2/2014 | Markosyan |
| 8,735,101 | B2 | 5/2014 | Markosyan |
| 2008/0271205 | A1 | 10/2008 | Yamaguchi |
| 2011/0059218 | A1 | 3/2011 | Corliss |

FOREIGN PATENT DOCUMENTS

JP        58-20170 A1    2/1983

OTHER PUBLICATIONS

Matthews et al. "Lactic Acid Bacteria as potential Source of Enzymes for Use in Vinification" Applied and Environmental Microbiology vol. 70 No. 10 p. 5715-5731 (Year: 2004).*

* cited by examiner

*Primary Examiner* — Felicia C Turner
(74) *Attorney, Agent, or Firm* — Kevin H. Fortin, Esq.

(57) ABSTRACT

A low-calorie sweetener composition, and method of manufacturing the same. The method includes providing a first sweetener having a mean particle size of between 100-350 μm in diameter and coating the first sweetener with a second sweetener. The first sweetener is sucrose. The second sweetener is an enzymatically modified steviol glycoside. The sweetener composition optimally includes at least 95% table sugar and at least 1% steviol glycoside. The steviol glycoside having been modified by action of at least one enzyme, the enzyme being a fungal exoenzyme selected from the group consisting of: laccase, manganese-dependent peroxidase (MnP), lignin peroxidase (LiP), versatile peroxidase (VP), monooxygenase, and combinations thereof.

4 Claims, 2 Drawing Sheets

10 →

12 → Providing an enzymaticaly glycosylated stevia glycoside such as Rebaudioside A having a 90% or greater purity and mixing it in purified water.

14 → Coating a sugar granule having a mean diameter of between 100-300μm with the glycosylated stevia glycoside.

SWEETENER COMPOSITION INCLUDING ENZYMATICALLY PROCESSED STEVIA AND METHOD OF MANUFACTURING

CROSS-REFERENCE TO RELATED APPLICATIONS

This patent application claims the benefit of: U.S. Provisional Patent Application No. 62/168,455, filed on 29 May 2015, U.S. Provisional Patent Application No. 62/089,729, filed 9 Dec. 2014, U.S. Provisional Patent Application No. 62/082,739, filed 21 Nov. 2014, the disclosures of these provisional patent applications are incorporated herein by reference.

FIELD OF THE INVENTION

The invention relates to compositions of *stevia*-based sweeteners and particularly to sweetener compositions including sucrose, *stevia* and methods of producing the same.

BACKGROUND

Table sugar sold at retail is sucrose. Sucrose generally consists of equal parts glucose and fructose, although these ratios can vary. Table sugar has an established standard of sweetness which is widely recognized in the food and beverage industry. It can be derived from sugar cane, sugar beets, or other plants.

Table sugar has about 16 calories per teaspoon sized (i.e. 4 gram) serving. For those concerned about caloric consumption, sugar may not be the sweetener of choice. Low calorie or "zero" calorie sweeteners have been rising in popularity.

Many countries and regions have regulations defining permitted bounds of "zero" labeling. For example, in the U.S. the US Food and Drug Administration definitions regarding zero calorie sweeteners encompasses a 5 calorie maximum. In Europe the number is about 4 calories. Sugar substitutes that yield a sweet flavor are often labeled with the "Zero" calorie claim, which may seem healthier to some.

Sugar substitutes including high intensity sweeteners bearing the "Zero" calorie claim typically include a range of 2.8-3.2 calories per serving. Each serving has the sweetening capability of one serving of sugar. Unfortunately, when using high intensity sweeteners, there are often fillers used that may be health-adverse.

High intensity sweeteners including saccharin, sucralose and aspartame. These are popular with diabetics who need to monitor their sugar intake and blood sugar levels and individuals seeking weight loss. Some artificial sweeteners have been linked to health risks and side effects and possibly may increase fat storage and worsen food cravings leading to over eating and weight gain.

Typically high intensity sweeteners include fillers such as corn dextrose and maltodextrin. These are applied in a spray dry method that creates a powder that flows in a sugar-like manner. Some consumers avoid these fillers.

In view of the drawbacks of various sweeteners, many consumers prefer a healthier alternative. Low-caloric and high intensity sweeteners of natural origin are becoming increasingly popular.

*Stevia rebaudiana* is a plant species in the genus *Stevia*. It is also commonly known as sweetleaf, sweet leaf, and sugarleaf. The term *Stevia* generically refers to the plant, its' leaves and derivatives thereof. *Stevia* has been used for more than 1500 years in South America as both a sweetener and a medicine. *Stevia* is now widely cultivated and there are approximately 250 known species.

*Stevia rebaudiana* is widely grown for its sweet leaves, which are the source of sweetener products known generically as *Stevia* and sold under various trade names. There are various active compounds that yield a sweet flavor in *stevia*. These are generically known as steviol glycosides. Stevioside and Rebaudioside Are both abundant and well-known. Other steviol glycosides detected in *stevia* include Rebaudioside B, C, D, E, and Dulcoside A.

Steviol glycosides differ from each other not only by molecular structure, but also by their taste properties. Stevioside can be 110-270 times sweeter than sucrose. Rebaudioside A can be between 150 and 300 times sweeter. Research reports reveal Rebaudioside C to be between 40-60 times sweeter than sucrose. Dulcoside A can be 30 times sweeter than sucrose.

Rebaudioside A has the least astringent, the least bitter, and the least persistent aftertaste of the major steviol glycosides. Accordingly, Rebaudioside A is the most popular steviol glycoside used in foods, beverages and sweeteners.

Aglycones are another component of *Stevia rebaudiana* leaves, but Aglycones have a bitter flavor. Various kinds of extraction processes are utilized to isolate desired steviol glycosides from the aglycones and other bitter components. This yields a refined *stevia* product with less bitterness.

Unfortunately, steviol glycosides often possess flavor defects such as bitterness, aftertaste, metallic flavor, licorice flavor, etc. These detectable flavor defects are not desirable.

Some natural *stevia* sweeteners may use the erythritol and dilute the *stevia* after taste with "natural flavors" which are typically corn based derivatives, including hydrogenated isomalts.

International patent publication WO2011048616 A2 discloses a sweetener consisting of sugar, *stevia* and sodium chloride (salt). The sodium chloride functions as a bitter blocker to inhibit detection of bitterness when the sweetener is consumed. However, not every consumer wants a salted sweetener.

What is desired is a sweetener that is natural, non-toxic and has few flavor defects. What is also desired is a way of providing a sweetener that is easy to produce. What is further desired is a sweetener having a low glycemic index and fewer than 5 calories per serving. What is further desired is a natural sweetener without unnecessary fillers.

SUMMARY OF THE INVENTION

The present invention includes a low-calorie and natural sweetener composition and a method for producing a low-calorie sweetener composition. Preferably this composition has fewer than 5 calories per serving, and more preferably between 2.8-3.2 calories per serving and complies with "Zero" calorie labeling requirements.

In one embodiment, the composition is a mixture of sugar granules and enzymatic treated *stevia* granules of approximately the same size. Utilizing same size particles helps to avoid segregation of the granules during shipping. This is important because when small amounts of sweetener are used a uniform sweetness is desired. Segregation of granules can dramatically change the sweetness of any particular sample.

In another embodiment, the composition is uniform. Particularly, sugar granules are coated with enzymatically treated *stevia*. This mitigates the possibility of segregation. The coating may be uniform or applied on one or more sides of the sugar granules.

In the embodiment utilizing a coating, a method for making the composition includes providing a first sweetener, i.e. table sugar, having a mean particle size of between 100-350 μm in diameter and a moisture content of less than 10%, and providing a second sweetener in an aqueous solution including sugar and at least one steviol glycoside. The steviol glycoside has been enzymatically treated to minimize bitter aftertaste. This flavor modification can be achieve by modifying the steviol glycoside molecule, its isoform, or by effectuating how the taste receptors of the human tongue sense sweetness, or any combination thereof.

This method can be applied in a number of ways. In one embodiment, the method includes heating the second sweetener to above 78° C. and pressurizing the second sweetener in a pressure vessel at above 1 atm of pressure, next the method vibrates the first sweetener solids in a fluid bed processor, and coats the first sweetener with the second sweetener in the fluid bed processor to yield a low-calorie sweetener composition. In one embodiment, the fluid bed processor or other drying process, dries the low-calorie sweetener composition to between 0.5-10% moisture content, and preferably less than 5% moisture content.

The invention encompasses a salt and filler free sweetener composition including steviol glycoside including Rebaudioside A having a 95% or greater purity, or stevioside. The steviol glycoside coats granular table sugar having a mean particle size of between 100-300 μm.

In one embodiment, the steviol glycoside is purified Rebaudioside A. Ideally the steviol glycoside coating has a thickness of between 1-20 μm to yield a sweetness of the sweetener composition of 4-5 times that of table sugar.

In another embodiment, the Rebaudioside A has a purity of 98% or greater.

In yet another embodiment, the steviol glycoside is coated only with stevioside and the thickness of the coating is at least 10 μm.

The composition yields a sweetener composition 4-5 times the sweetness of sucrose and has less than 5 calories per serving to enable a "Zero" calorie claim.

Enzymatic Treatment Using *Bacillus* Bacteria

Many ways have been attempted to reduce the bitterness in *stevia*. One way is to produce modified Steviol Glycosides by treating *stevia* with enzymes. This typically is accomplished through a process called Glucosylation. Glucosylation yields steviol glycosides that include additional glucose moieties bonded to the original steviol glycoside structure via α(1-4) linkages. Adding additional glucose moieties to the original steviol glycoside structure significantly increases sweetness and reduces bitterness.

The process of making Glucosylated Steviol Glycosides includes drying and crushing leave from *Stevia rebaudiana* Bertoni and extracting the water soluble components in order to obtain *stevia* extract powder containing 30%-60% Rebaudioside A. The powder is further refined by precipitation of the steviol glycosides by using ferric chloride and calcium hydroxide. This can yield steviol glycosides in a powder having a high purity of 95% or greater, for example.

The enzymatic treatment of these steviol glycosides begins by dissolving the high purity steviol glycoside powder it in water and reacting in the presence of dextrins. Dextrins are mixtures of polymers of D-glucose units linked by α-(1→4) or α-(1→6) glycosidic bonds.

Glycosylation can be achieved with enzymatic modification with *Bacillus licheniformis* and/or *Bacillus stearothermophilus* bacteria, for example. An example of a glycosylation process is disclosed in WO2013058871A1. The Glycosylation enzymes include cyclodextrin glycosyltransferase (CGTase) produced using a genetically modified strain of *Bacillus stearothermophilus* to treat the steviol glycosides. Additionally, α-amylase, used in a second process to purify the treated steviol glycosides. *Bacillus licheniformis*, is a bacterium commonly found in soil and on bird feathers is used to produce the α-amylase.

The enzymatic modification of the performs a glycosylation reaction to add glucose moieties to the steviol glycosides. The solution can be deactivated, absorbed and desorbed in methanol or ethanol, concentrated and filtered to yield a crystallized product.

Enzymatic Treatment Using Fungal Exoenzymes

Modification of steviol glycosides can be achieved through the use of enzymes from Basidiomycota and other higher fungi. In one embodiment of the invention, the modification is achieved through a process known as glycosylation.

In one embodiment glycosylation can be achieved by the use of fungal exoenzymes in the presence polysaccharides. The polysaccharides are produced by Basidiomycetes fungi, or added sugars such as dextrin, for example. Examples of such higher fungi include *Armillariella mellea, Auricularia auricula-judae, Coriolus versicolor, Flammulina velutipes, Fomes fomentarius, Ganoderma applanatum, Ganoderma lucidum, Pleurotus ostreatus, Schizophyllum commune, Trametes hirsuta*.

The fungal polysaccharides produced by these Basidiomycetes, when subject to hydrolysis yield constituent hydrolyzates. These hydrolyzates have been studied and in certain circumstances include arabitol (0.01-10.2%), arabinose (0.09-1.3%), ribose (0.2-1.8%), fucose (0.3-1.2%), mannitol (0.01-5.3%), sorbitol (0.01-0.05%), galactiol (0.04%), fructose (0.08-0.8%), galactose (0.9-29%), glucose (10-53%), uronic acids (0.14-3.7%), sucrose (0.03-2%), trehalose (0.2-1%), cellobiose (0.01-0.6%), maltose (0.2-1.9%), other disaccharides (0.2-8%). (ii) The total of acids varied from 1.5 to 30% including o-phosphoric (1.3-19%), malic (0.08-4.7%), citric (0.08-4.7%), isocitric; (3%) and $C_{16}$-$C_{18}$ fatty acids (1-6%). These hydrolyzates may affect the perception of flavor by taste receptors of the human tongue, some may be considered "bitter blockers". In one embodiment of the invention, the enzyme complex includes fungal polysaccharides, and fungal metabolites, and constituent hydrolyzates, which can be considered fungal enzyme metabolites.

Thus, under appropriate conditions the polysaccharides naturally produced by the fungal mycelium can yield glucose molecules necessary to achieve glycosylation of steviol glycosides. This makes possible a one-step process for the glycosylation of steviol glycosides using the hydrolyzates.

The use of Basidiomycota fungi is preferred over bacteria because particular strains of higher fungi are capable producing exoenzymes appropriate for modification of steviol glycosides and the glucose needed for glycosylation of the steviol glycosides. In an alternate embodiment, added dextrose, glucose or other sugar can substitute or supplement the glucose molecules derived by the fungi to effectuate glycosylation.

Most of the exoenzymes produced by Basidiomycota, and particularly white rot fungi, which are capable of modification of plant lignin. Lignin is typically found in wood and is the second most abundant renewable organic polymer on earth. Lignin tends to be bitter in flavor and indigestible for humans. Lignin-Modifying Enzymes (LME's) of Basidiomycota fungus have been studied in the recent decades. Most of the research is focused on converting lignin into bio-fuels, paper products, and other products. In addition to breaking down plant lignin, these enzymes are highly oxidative to other materials.

The various Lignin-Modifying Enzymes (LME's) from Basidiomycota fungal mycelium include a set of hydrolytic enzymes typically composed of endoglucanase, cellobiohydrolase and beta-glucosidase. Laccase, manganese-dependent peroxidase (MnP), and lignin peroxidase (LiP) are examples of common enzymes. Such enzymes can be produced efficiently in a liquid or solid state culture and commonly occur in nature.

The enzymes used for glycosylation are a complex of enzymes naturally derived from the mycelium of basidiomycetes fungi, and preferably polyporales mushroom mycelium. This complex of enzymes is termed a reagent solution.

The reagent solution is an enzyme complex including lignin modifying enzymes, and catalyst enzymes including lyctic polysaccharide monooxygenases (LPMO's) such as cytochrome P450 monnooxygenases (P450s) or any of the copper-dependent CAZy AA13 family of proteins. In the presence of a glucose molecule donor, these can effectuate glycosylation and other oxidative reactions, i.e. to cleave glucose molecules from the donor molecule which can be a complex polysaccharide molecule such as β-glucan. These catalyst enzymes can cleave glucose from most carbohydrates and starches, particularly when combined with Lignin-Modifying Enzymes produced by higher fungi.

The various Lignin-Modifying Enzymes (LME's) from basidiomycetes, polyporales and polypore mushroom mycelium include a set of hydrolytic enzymes, including endoglucanase, cellobiohydrolase and β-glucosidase.

LME's can be produced efficiently in a liquid state culture and commonly occur in nature. Laccase, manganese-dependent peroxidase (MnP), lignin peroxidase (LiP), and versatile peroxidase (VP) are specific examples of well-known LME's produced by these fungi.

The genes encoding the cellulases belonging to the families GH6, GH7, GH9 and carbohydrate-binding module family CBM1 are somewhat unique to white rot polyporales and are not typically found in many brown rot polyporales. According to one aspect of the invention, the reagent solution is derived from polyporales includes genes encoding the cellulases belonging to the above-mentioned families.

The steviol glycoside is post treated with an LPMO, a LME and a cyclodextrin glycosyltransferase (CGTase) derived from polypore mushroom mycelium, or any combination thereof. The CGTase catalyzes at least three reactions including cyclization, coupling and disproportionation. The CGTase can be an alpha, beta or gamma CGTase, or any combination thereof. Preferably, the CGTase is an α-CGTase.

The LPMO's also catalyze numerous reactions to remove or modify flavor defects in the starting material i.e. steviol glycosides. These reactions may also yield metabolites that function as bitter blockers that change the perception of bitterness by the taste receptors on the human tongue.

A sweetener composition of the present invention includes a steviol glycoside including Rebaudioside A having at least a 95% purity, the steviol glycoside being modified by a fungal enzyme selected from the group consisting of: Laccase, manganese-dependent peroxidase (MnP), lignin peroxidase (LiP), versatile peroxidase (VP), monooxygenase, and combinations thereof.

The steviol glycoside coats table sugar having a mean granule size of between 100-300 µm. Preferably, the steviol glycoside includes only Rebaudioside A having a purity of 98% or more to yield a sweetness of between 4-5 times that of sucrose.

A method for improving flavor of a *stevia* and sucrose based sweetener composition includes providing dry steviol glycoside having a particulate size of less than 300 µm, and dissolving the steviol glycoside in purified water to make a steviol glycoside solution.

The method also includes cultivating a liquid culture of fungal mycelium under sterile conditions to create fungal exoenzymes. An aliquot of this liquid culture is combined the steviol glycoside solution to enable the fungal exoenzymes to modify the steviol glycoside. The fungal mycelium and enzymes are deactivated and coated onto table sugar (sucrose) having a mean diameter of less than 300 µm.

This method for improving flavor as set forth in claim 15, wherein the step of combining lasts for between one minute to one hour, and preferably less than 10 minutes. In one example, the fungal mycelium is a pure culture of *Ganoderma lucidium*.

In another embodiment, the methods of the present invention yield sucrose coated with crystalline steviol glycoside. This particular crystalline steviol glycoside having been modified by action of at least one enzyme, the enzyme being selected from the group consisting of: laccase, manganese dependent peroxidase (MnP), lignin peroxidase (LiP), versatile peroxidase (VP), monooxygenase, and combinations thereof.

Accordingly, the present invention seeks to provide a sweetener product that is low in calories and tastes like sugar.

DETAILED DESCRIPTION

Figure 1:
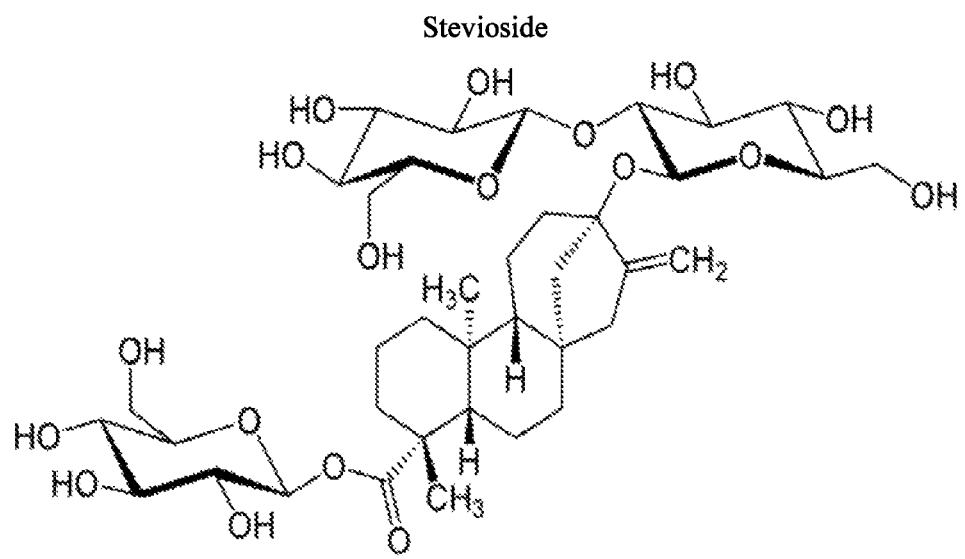
FIG. 1 is a Stevioside molecule.
Figure 2:
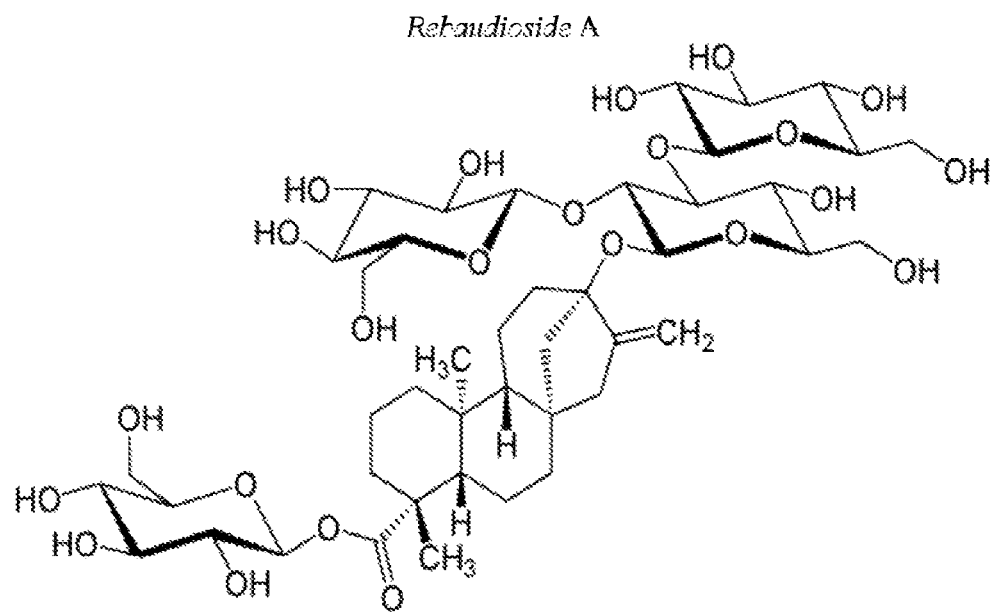
FIG. 2 is a Rebaudioside A molecule.

The present invention includes a sweetener having less than 4-5 calories per serving. This is achieved by a novel process which coats granules of table sugar (sucrose) having a specified average granular size with an enzymatically treated *stevia*-based mixture. The *stevia*-based mixture includes at least some modified steviol glycosides. The steviol glycosides are enzymatically modified with either fungal exoenzymes or bacterial enzymes under controlled conditions.

In one embodiment of the invention, the table sugar has a granule size having a mean particle size in the range of 100-600 µm. Preferably the granule size has a mean particle size of 100-300 µm, and more preferably the mean particle size is between 125-175 µm. Ideally the mean particle size is 150 µm. The mean particle size is calculated as the hypothetical mesh aperture of a sieve that allows 50% of the sugar to pass.

The invention applies a coating to each granule in order to increase the sweetness of each granule to yield a sugar-

*stevia* product that is 3-10× sweeter than sugar, and preferably closer to 5× the sweetness of sugar.

The coating in one embodiment of the invention is approximately 1-10 μm thick and fully coats each sugar granule. The coating in another embodiment of the invention is approximately 10-20 μm thick and fully coats each sugar granule. The coating thickness varies with the purity and sweetness of the *stevia* mixture, and the size of the sugar granule.

In an alternate embodiment, the table sugar granules are coated, having 90% (on average) of the granule surface area of the sugar covered by the coating.

In one embodiment the composition is 92-99% table sugar granules. The table sugar granules are dry, having a moisture content of less than 10%, preferably less than 5%, and more preferably within the range of 0.5-3%.

Table sugar is defined herein to include a mixture of glucose, fructose, dextrose, sucrose, or any combination thereof. Table sugar can be made from sugar cane, beets, or other plants. Preferably, the table sugar is has an approximate 50/50 ratio of glucose and fructose. It can be appreciated that this ratio can vary to include any ratio that enables commercial scale distribution of the table sugar.

The table sugar granules are coated with a *stevia* mixture, particularly a steviol glycoside solution.

The composition of the present invention is dry (having less than 10% moisture content). Hydration of this composition is enabled by mixing with water. The dry composition includes 1%-8% of dry steviol glycoside and 92%-99% table sugar, by volume. Accordingly, where the steviol glycoside solution coats the sugar granules, and where the sugar granules have a granular diameter of 100-300 μm, whereby the composition is 4-6 times sweeter than table sugar. In this way, one serving of the composition has approximately 75%-85% less calories than table sugar per serving. Presumably, the glycemic response to the composition is reduced in proportion to the lesser volume of sugar calories.

In another embodiment the composition is 97-99% sugar and 1-3% steviol glycoside solution, by volume. Preferably, the steviol glycoside solution comprises 90-98% purity Reb A in an aqueous solution. More preferably the steviol glycoside solution comprises 95-98% purity Reb A in an aqueous solution.

In alternate embodiments, the aqueous solution further contains sucrose and dextrose along with the steviol glycoside. After the steviol glycoside solution is applied to the sugar granules, the composition is dried to the desired moisture content, for example a 3-5% moisture content.

Utilizing an aqueous solution for applying the steviol glycoside coating assures maximization of the area covering the table sugar granules. Optimally the steviol glycoside coating is uniformly distributed on the table sugar granules.

The combination of a portion of table sugar to the steviol glycoside may improve coating integrity and adhesion of the steviol glycoside solution to the table sugar granules when applied and dried.

Preparation of the steviol glycoside solution includes heating the steviol glycoside solution to fully dissolve the portion of sugar and the *stevia* glycoside to make the steviol glycoside solution. In one embodiment, the steviol glycoside solutions is heated to 78-107° C. for a period of about 8-20 minutes to enable preparation of the steviol glycoside solution.

Applying the steviol glycoside solution is accomplished in accordance with one aspect of the invention by a fluid bed coating system that circulates heated air in a chamber to agitate the sugar granules, and simultaneously heats and sprays the steviol glycoside solution from the bottom of the chamber to uniformly coat the sugar granules. Heating the steviol glycoside solution enables optimal viscosity of the solution as well as adherence of the solution to the granules.

Drying the granules after application of the steviol glycoside solution is accomplished in a separate fluid bed drying apparatus, or in the same the fluid bed coating system, which is adapted to perform a drying function.

Calculating the volume of the coating can utilize the formula:

$$\frac{4}{3}\pi(r_1 + r_2)^3 - \frac{4}{3}\pi r_1^3 = V_c$$

where $r_1$ is the radius of the sugar granule and $r_2$ is the radius of the coated granule, and $V_c$ is the volume of the coating. Accordingly thickness of the coating (or range thereof) can be determined for any granule size, knowing the desired volumetric ratio of the sugar/*stevia* glycoside ratio.

Manufacturing Method

A method for producing a low-calorie sweetener composition that has no fillers, and has less than 5 calories per serving, and virtually no flavor defects includes:

a) providing a first sweetener including table sugar having a mean particle size of between 100-350 μm in diameter;

b) providing a second sweetener in an aqueous solution including at least one steviol glycoside that is modified by either fungal exoenzymatic action or by action of bacterial derived enzymes;

c) heating the second sweetener to above 78° C. and pressurizing the second sweetener in a pressure vessel at above 1 atm of pressure to enable atomization;

e) agitating the first sweetener solids in a fluid bed processor;

f) coating the first sweetener with the second sweetener by spraying in an upward direction to yield a low-calorie sweetener composition;

g) drying the low-calorie sweetener composition to between 0.5-10% moisture content to yield a sweetener composition having less than 5 calories per serving and each serving having a sweetness of a serving of sucrose.

The method includes establishing an atomization pressure between 14.7 psi-50 psi, and preferably 25 psi atomizing air pressure and 15 psig liquid pressure in a fluid bed processor. The method of spray can be top spray, or bottom spray or both. Preferably top spray is used. Excipient distributions are variable depending on granular size of sugar granules, and the desired caloric content of the product.

Testing conducted utilized a range from 2-4 tablespoons of Rebaudioside A having a 98% purity (RA98), which was distributed over approximately 7-8 pounds of table sugar. The Rebaudioside A is dissolved in water at a concentration of 5 Tbsp/liter in order to achieve a viscosity optimal for spraying. No fillers or salts are added in this embodiment of the invention.

In general, Rebaudioside A having at least a 98% purity (RA98) tends to create suspended solids in solution with water, as opposed to lower grades which readily dissolve. The effective viscosity of the steviol glycoside solution, particularly the RA98 mixture, creates a unique problem because the spray is viscous. Little of the steviol glycoside solution is needed relative to other coating technologies because of the intense sweetening capabilities of RA98.

Accordingly the RA98 steviol glycoside solution is diluted to five (5) table spoons per liter of water. The substrate mixing that occurs on a fluid bed spread the spray evenly and provides for good particle-to-particle transfer of the coating, while the heated air dries away water and prevents the product from dissolving or "clumping."

Figure 3:
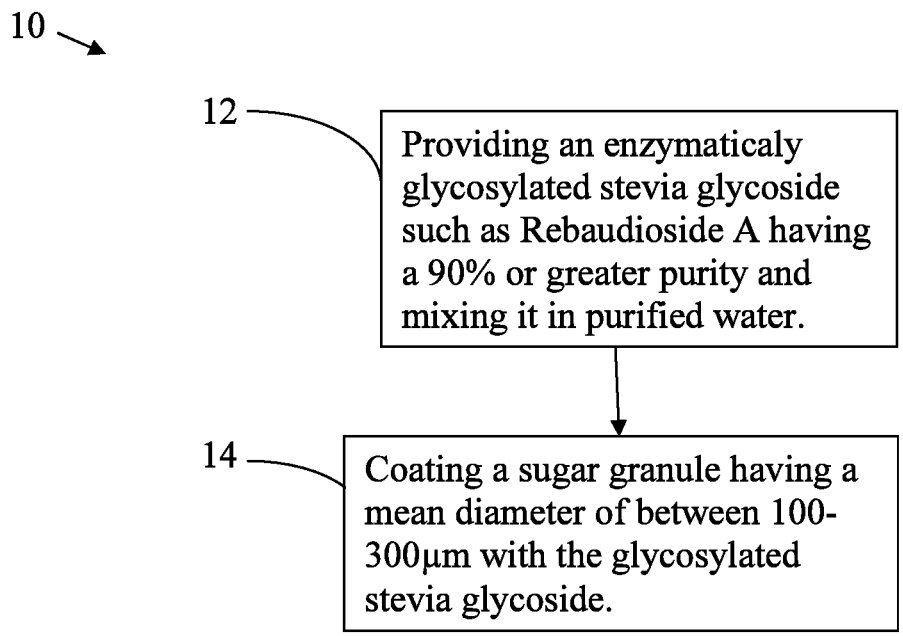
FIG. 3 is a method of making a composition in accordance with the present invention using an enzymatically modified steviol glycoside.

FIG. 3 is a method 10 of enzymatic treatment of *stevia* in accordance with the present invention. The method 10 includes the step 12 of providing an enzymatically glycosylated steviol glycoside such as Rebaudioside A having a 90% or greater purity and mixing it in purified water. Preferably, the Rebaudioside A has a purity of greater than 97%.

The method 10 includes the step 14 of coating a sugar granule having a mean diameter of between 100-300 μm with the glycosylated *stevia* glycoside. The coating is only a fraction of the sugar granule mean diameter, or 5-20 μm to minimize segregation of the sugar granules. All of the sugar granules are coated in one embodiment of the invention. In an alternate embodiment a portion are coated and mixed with sugar granules that are uncoated. Coating can be a partial coating on the sugar granules or a complete coating of the sugar granules. The composition has between 1-3% steviol glycoside on a dry weight basis, and between 97-100% sucrose on a dry weight basis.

Figure 4:
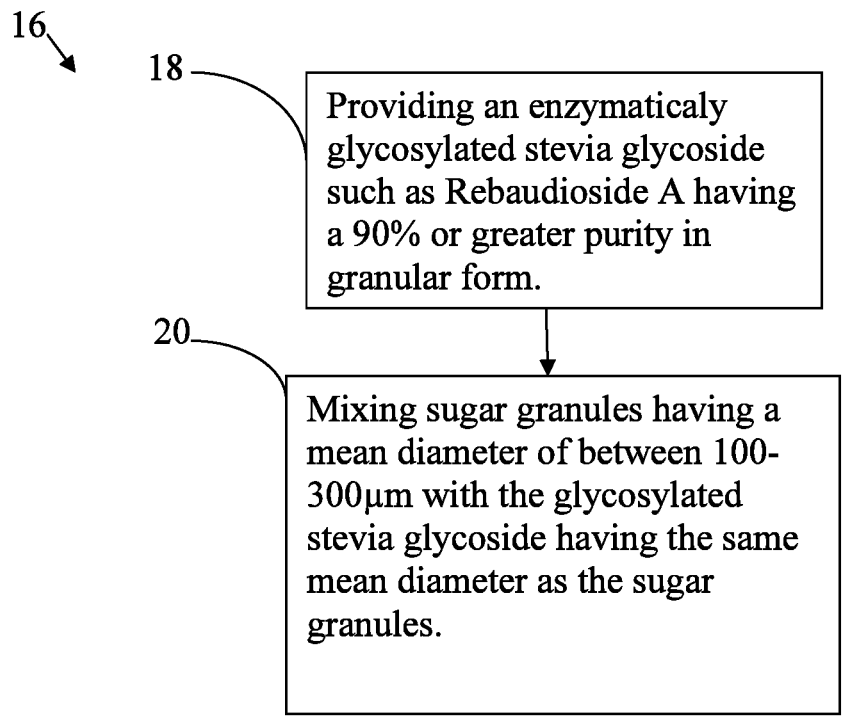
FIG. 4 is a method of making a mixture in accordance with the present invention.

FIG. 4 shows a method generally designated with the reference numeral 16. The method 16 includes the step 18 of providing an enzymatically glycosylated *stevia* glycoside such as Rebaudioside A having a 90% or greater purity in granular form. The method 16 also includes the step 20 of mixing sugar granules having a mean diameter of between 100-300 μm with the glycosylated *stevia* glycoside having the same mean diameter as the sugar granules. The "same" as used in this paragraph means a diameter sufficient to effective eliminate segregation of the sugar granules and *stevia* granules during normal handling of the mixture. In one embodiment the diameter of the coated sugar granules have a mean diameter that does not exceed the mean diameter of the uncoated sugar granules by more than 10%

Various examples of the sweetener compositions in accordance with the present invention are provided by way of example, but not limiting of the scope of the present invention.

Example 1

A sweetener composition that is about five time sweeter than sugar uses a 95% or greater purity Rebaudioside A coating over granular sugar, where the sugar content 97-98.5%, and the Rebaudioside A content is 1.5-3% by volume. The granular sugar has a mean particle size of between 100-300 μm, and less than 5 calories per serving. The Rebaudioside A is modified by enzymatic glycosylation to virtually eliminate any bitter aftertaste, and other flavor defects.

Example 2

A sweetener composition that is about four time sweeter than sugar uses a 98% or greater purity Rebaudioside A coating over granular table sugar, where the sugar content 98-99%, and the Rebaudioside A content is 1-2% by volume. The granular sugar has a mean particle size of between 100-150 μm, and between 4-5 calories per serving. The Rebaudioside A has been modified by enzymes to minimize perceived flavor defects.

Example 3

A sweetener composition that is about five times sweeter than sugar uses a stevioside coating over granular sugar, where the sugar content is 92-94%, and has a steviol glycoside content of 6-8% by volume, and less than 5 calories per serving. The coating is less than 20 μm in thickness. The steviol glycoside being modified by enzymatic glycosylation to virtually eliminate any bitter aftertaste, and other flavor defects.

Example 4

A sweetener composition uses a 98% or greater purity Rebaudioside A coating over granular table sugar, where the sugar content 98-99%, and the Rebaudioside A content is 1-2% by volume. The granular sugar has a mean particle size of between 100-300 μm, and less than 5 calories per serving. The Rebaudioside A being enzymatically modified by a mix of polypore mushroom enzymes to minimize perceived flavor defects. The sweetener composition has between 2.5-3.5 calories per serving.

While the above examples and the specification of this patent application are exemplary in nature, the true scope of the invention is defined by the appended claims. It can be appreciated that the mechanism of action of modifying the steviol glycoside is, in one embodiment of the invention, by the addition of fungal metabolites created by action of an enzyme complex on the steviol glycoside, where the enzyme complex includes one or more of laccase, manganese-dependent peroxidase (MnP), lignin peroxidase (LiP), versatile peroxidase (VP), monooxygenase, and combinations thereof. In another embodiment, the action of these enzymes directly modifies the steviol glycoside molecule, particularly its isoforms.

I claim:

1. A method for producing a low-calorie sweetener composition comprising:
    a) providing a first sweetener including table sugar having a mean particle size of between 100-350 um in diameter;
    b) providing a second sweetener in an aqueous solution including at least one steviol glycoside that has been subject to enzymatic treatment by monooxygenase;
    c) coating the first sweetener with the second sweetener to yield a low-calorie sweetener composition; and
    d) drying the low-calorie sweetener composition to between 0.5-5% moisture content to yield a sweetener composition having less than 5 calories per serving.

2. The method as set forth in claim 1, wherein the coating thickness is between 1-20 um.

3. The method as set forth in claim 1, wherein the aqueous solution has a concentration of at least 5 tablespoons of steviol glycoside per liter of water to maintain flow ability of the aqueous solution.

4. The method as set forth in claim 3, wherein the steviol glycoside is modified by an enzyme complex including laccase, manganese-dependent peroxidase (MnP), lignin peroxidase (LiP), versatile peroxidase (VP), and monooxygenase.

* * * * *